Jan. 17, 1933.  B. J. O'CONNOR ET AL  1,894,784
DEVICE FOR CUTTING OFF TUBING
Filed Aug. 2, 1930  2 Sheets-Sheet 1
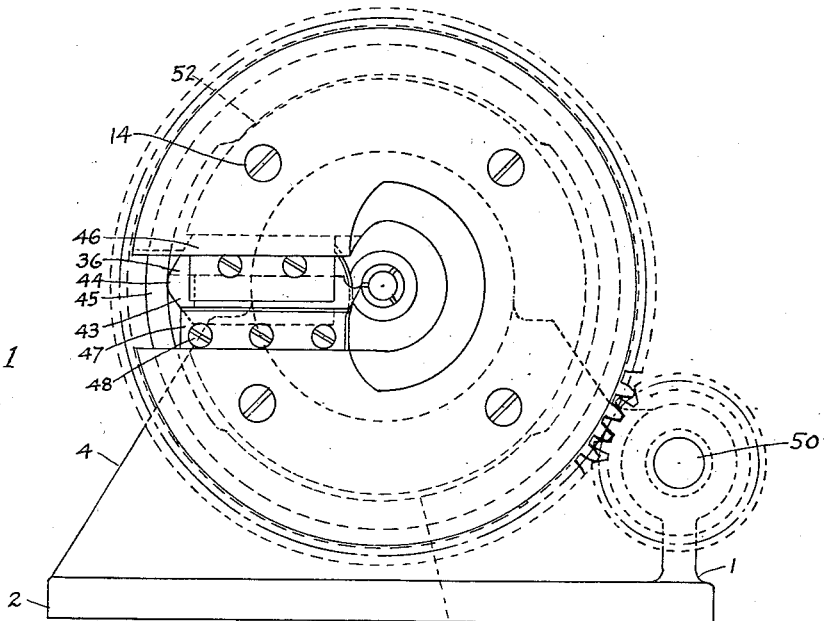
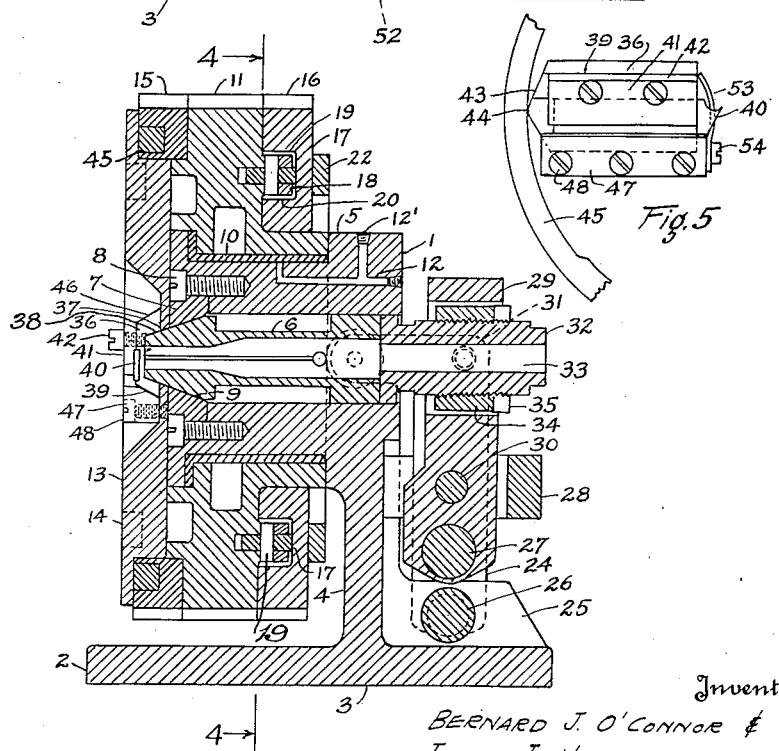
Inventor
BERNARD J. O'CONNOR &
JOHN J. HANNON
By Richy & Watts
Attorney

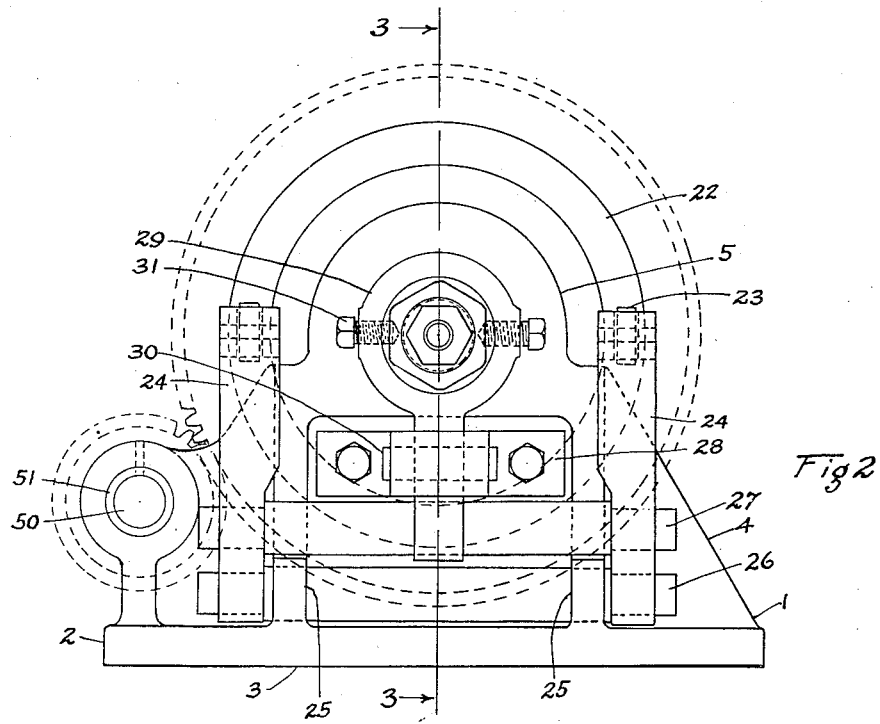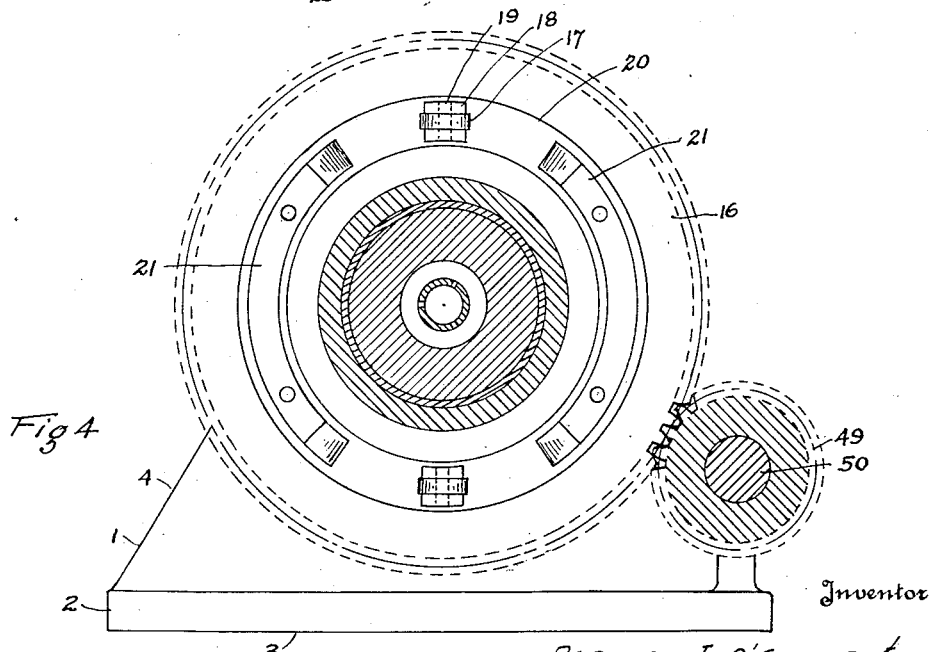

Patented Jan. 17, 1933

1,894,784

UNITED STATES PATENT OFFICE

BERNARD J. O'CONNOR AND JOHN J. HANNON, OF CLEVELAND, OHIO, ASSIGNORS TO STEEL AND TUBES, INC., OF CLEVELAND, OHIO, A CORPORATION OF OHIO

DEVICE FOR CUTTING OFF TUBING

Application filed August 2, 1930. Serial No. 472,519.

This invention relates to the art of cutting off metallic articles, such as tubing or bar stock.

One of the objects of the invention is to provide a machine which will cut off hollow metallic articles such as tubing rapidly without deforming the articles.

Another object of the invention is to provide a machine which will cut off metallic articles, such as tubing or bar stock, having automatic cutting and article gripping means which are synchronized together so that the article is gripped just before the cutting begins and is released just after the cutting is finished.

Other objects will be apparent from the specification and the accompanying drawings which disclose one embodiment of our invention and in which:

Fig. 1 is a front elevation of the machine;
Fig. 2 is a rear elevation;
Fig. 3 is a section on the line 3—3 of Fig. 2;
Fig. 4 is a section on the line 4—4 of Fig. 3; and
Fig. 5 is a detail view of the cutter mechanism.

The illustrated embodiment of our invention includes a cast frame 1 having an integral base 2 provided with a flat bottom 3 for fastening to a bench or other support. A web 4 projects upward from the base 3 and is provided with a bearing support 5 at its upper end. All of these members are cast integral.

Within the bearing support 5 is a collet 6 for gripping the article to be cut, such as tubing or bar stock, during the cutting operation. For different sizes and shapes of articles a different collet may be used and if desired a different type of chuck may be used for holding the article to be cut. The bearing support 5 has an annular plate 7 (Fig. 3) fastened to its front end by screws 8. Extending through plate 7 is a tapered hole 9 which co-acts with the tapered nose of the collet 6.

The peripheral surface of the bearing support 5 is encased in a bronze bearing 10 upon which the gear 11 is rotatably mounted. Any suitable bearing material other than bronze may be used, however. The bearing is supplied with lubricating oil by the drilled passages 12 having screw plugs 12' at their outer ends for retaining the oil and for keeping dirt and other foreign matter out of the oil passages.

A face plate 13 is fastened to the gear 11 by means of four screws 14. Between the face plate 13 and the gear 11, the ring gear 15 is rotatably mounted. Upon a shoulder at the other side of the gear 11, the gear 16 is rotatably and slidably mounted.

These three gears 11, 15, and 16 are driven by a common pinion 49 which has a face wide enough to engage all of the three gears, 11, 15, and 16 in any of their positions. The pinion 49 is mounted upon the shaft 50 which is driven from a suitable source (not shown) at one end, and is supported at the other end by the bearing 51 (Fig. 2). The gear 11 has one or more teeth in excess of the number of teeth on gears 15 and 16 but retains the same pitch diameter as gears 15 and 16. In the present instance the gear 11 has 81 teeth, the gears 15 and 16 have 80 teeth and the pinion 49 has 24 teeth. These numbers of teeth may be changed if desired. It is only necessary to provide rotation of gears 11, 15, and 16 and a relative rotation between gears 11 and 15 and 16. Thus the middle gear 11 may have a fewer number of teeth than either of gears 15 and 16.

On the rear face of the gear 11 are a pair of rollers 17, 17, arranged diametrically opposite to each other. Each of the rollers 17 is supported by one of the pins 19 between a pair of ears 18 which are cast integral with and project from the rear face of the gear 11. One of the pins 19 is passed through each of the pairs of ears 18 and one of the rollers 17.

Within the gear 16 is an annular groove 20 for receiving the rollers 17. Fastened in the bottom of this groove 20 are two arcuate cam pieces 21 (Fig. 4) arranged diametrically opposite for co-acting with the diametrically opposite rollers 17. On the rear face of the gear 16 is fastened a ring 22, (Figs. 2 and 3) which provides a track for each of the pair of roller followers 23 which are supported by the end of the inverted L shaped levers 24.

Upstanding from the base 3 are a pair of widely spaced webs 25. The shaft 26 is supported by bearings within the spaced webs 25. The inverted L shaped levers 24 are mounted on the ends of the shaft 26 which has a reduced diameter at each end for receiving the levers 24 and properly spacing them. The shaft 27 is similar to the shaft 26 and is supported between the pair of levers 24 directly above this shaft 26. A U shaped bracket 28 is fastened to the rear face of the web 4 and a yoke member 29 is pivotally mounted on this bracket 28 by means of a pin 30 which passes through both arms of the bracket 28 and also the yoke member 29. The lower end of the yoke member 29 has the shaft 27 passed therethrough and the upper end has two set screws 31 screwed therein each projecting inwardly from opposite sides.

An adjusting nut or collet follower 32 abuts the end of the collet 6 and has a bore 33 in its center for receiving the article to be cut. The outer surface of the collet follower 32 is threaded and carries a sleeve 34 having diametrically opposite recesses on either side threaded upon its outer surface and held by a hexagonal lock nut 35. The collet follower 32 is connected to the yoke member 29 by the diametrically opposite set screws 31 engaging in the diametrically opposite recesses of the sleeve 34 which is threaded onto the collet follower 32. A hexagonal end as shown in Figs. 2 and 3 is provided on the follower 32 for receiving a wrench. Thus complete adjustment is provided between the collet follower 32 and the yoke member 29 by means of the two set screws 31, and by screwing the collet follower 32 forward or backward within the sleeve 34 by unloosening the lock nut 35 and engaging its hexagonal end with a wrench.

The face plate 13 has an aperture in its center for receiving the nose of the collet 6 and about this aperture the face plate is chamfered away. A tool holder slide 36 (Figs. 1, 3 and 5) is disposed in a dovetailed slot guideway 46 at one side of the aperture in the face plate 13. The tool holder slide 36 has a flat guiding surface 37 on its rear face and beveled guiding surfaces 38 on the side faces. On the front face of the tool holder slide 36 is a notch for receiving the cutting tool 40 which is clamped and held in notches on the adjacent faces of the tool holder slide 36 and the tool clamp 41 by screws 42. At the rear end of the tool holder slide are converging faces 43 having their intersection rounded as at 44 for co-action with the internal ring shaped cam 45 which is seated within an internal shoulder of the gear 15.

The dovetailed-slot guideway 46 (Figs. 1 and 3) in the faceplate 13 has an adjustable gib 47 forming one of the converging sides of this guideway 46. This gib 47 is fastened to the faceplate 13 by means of the screws 48. By screwing these screws 48, an adjustment is provided to obtain a proper fit for the tool holder slide 36 in its guideway 46. A spring 53 (Fig. 5) is fastened to an end of the gib 47 by the screw 54. The upper end of the spring 53 bears against the flat end of the tool holder slide 39 and holds the nose 44 at its other end against the cam 45.

The internal ring shaped cam 45 has a pair of diametrically opposite lobes 52 each of which has a long "dwell" of gradually increasing height extending over a quadrant. Between each of the lobes are the base or low portions of the cam. When the cam rotates, the lobes 52 engage the nose 44 on the tool holder slide 39 and thus slowly cam the slide 39 inward and feed the cutting tool 40 into the article to be cut.

The pair of lobes 52 are positioned in such a relation to the pair of arcuate cam pieces 21 and the pair of rollers 17 are positioned in such a relation to the tool holder slide that the collet 6 grips the article to be cut off when the cutter 40 begins the cut and releases the article when the cut is completed. Thus the operation of the cutting tool 40 and the collet 6 is synchronized. In the present instance the tool holder slide 39 is placed 90° from the pair of rollers and the pair of lobes 52 are positioned 90° from the pair of arcuate cam pieces 21. These cam pieces 21 are slightly longer than the lobes 52.

The operation of the device is as follows: The pinion 49 is rotated at a suitable speed. This pinion rotates the gears 11, 15, and 16, the gear 11 being rotated at a slightly slower speed because of its greater number of teeth than the gears 15 and 16, which causes the gears 15 and 16 to gain revolutions upon the gear 11.

Because of the relative rotation of the gears 11 and 15 each of the pair of lobes 52 at regular periods engage the nose 44 of the tool holder slide once for each revolution the gear 15 gains upon the gear 11 and thus the pair of lobes 52 feed the cutting tool 40 into the article to be cut twice per gained revolution.

During the same regular periods, because of the relative rotation of the gears 11 and 16, the pair of rollers 17 engage the arcuate cam pieces 21 in the groove 20 and force the gear 16 axially, thus forcing the roller followers 23 rearwardly, pivoting the lever 24 about the shaft 26, and carrying the shaft 27 to the rear. By carrying the shaft 27 to the rear the lower end of the yoke member 29 is also carried to the rear and because the yoke member 29 is pivoted at its center, its upper end carries the collet follower 32 against the end of the collet 6 and thus causes the collet to grip the article to be cut during the feeding of the cutting tool into the article being cut.

In its use the device rotates constantly. The article to be cut, such as tubing or bar stock, is introduced into bore 33 at the rear of the machine and is pushed forward through the internal bore of the collet 6 when the collet is in released position until the end of the article projects the desired amount beyond the cutting tool 40, usually fixed by a stop at some external point on the table, bench or bed upon which the machine has been fastened. All this must be done very rapidly during the short interval in which the cams 21 and 49 permit the collet 6 and the cutting tool 40 to remain in inoperative position.

The cams 21 then cause the collet 6 to grip the piece and the lobes 52 of the cam 49 bring the cutting tool 40 into position and then feed it slowly into the article to be cut, according to the contour of the lobes, until the cut is completed and the desired end of the article is cut off. The cutting tool is then retracted by centrifugal force and the spring 53 upon the arrival of the end of one of the lobes 52 at the nose 44 of the slide 39 and at about the same time the grip of the collet is released when the rollers 17 reach the ends of the pair of cam pieces 21. The gripping action of the collet member on the articles passing therethrough is primarily a spring action. When the pressure which causes the collet member to grip the article is released the collet will spring back and assume its normal position. This springing action combined with the centrifugal force due to the rotating elements of the cutting device is effective in causing the collet to release the articles passing therethrough. The article to be cut may then be pushed forward and another piece cut off. In this manner an article of comparatively great length may be cut into a number of pieces of definite lengths in a relatively short time.

While a preferred embodiment of the invention has been shown and described, it will be apparent that modifications can be made within the spirit and scope of the invention and such modifications are intended to be covered by the appended claims.

We claim:

1. In a machine for cutting off an article, the combination of a cutting tool, means to revolve the cutting tool about the article, an annular member revolvable about the cutting tool to feed the cutting tool longitudinally into the article, means for gripping the article, and means revolvable at the same peripherial speed as said annular member for effecting the operation of said gripping means whereby the feeding of the cutting tool and the actuation of the gripping means are synchronized.

2. In a machine for cutting off an article, the combination of a cutting tool, means to revolve the cutting tool about the article to be cut, an annular cam member revolvable about the cutting tool at a different speed than that of the cutting tool for feeding the cutting tool into the article, means controlled by the said means to revolve the cutting tool for gripping the article whereby feeding of the cutting tool and the actuation of the gripping means are synchronized.

3. In a machine for cutting off an article, the combination of a cutting tool, means to revolve the cutting tool about the article to be cut and an annular cam revolvable about the cutting tool for feeding the cutting tool radially into the article, means for retracting it therefrom after the article is cut and means controllable by said means to revolve the cutting tool for gripping the article.

4. In a machine for cutting off an article, the combination of means to grip the article, a cutting tool, an annular member for feeding the cutting tool into the article to be cut, a cam for actuating the gripping means, and a single means for rotating the cutting tool, the annular member, and the cam about the article whereby the feeding of the cutting tool and the actuation of the gripping means are synchronized.

5. In a machine for cutting off an article, the combination of a bearing member, means within the bearing member for gripping the article, a cutting tool rotatable about the bearing member, means rotatable about the bearing member for feeding the cutting tool into the article, means rotatable about the bearing member for actuating the gripping means, and a single means for rotating the cutting tool at one speed and for rotating the feeding means and the means for actuating the gripping means at another speed.

6. In a machine for cutting off an article, the combination of a gear, a cutting tool carried by said gear, means to rotate the gear, means for actuating the cutting tool to cut an article, a second gear carrying a cam, means on the first gear for contacting with the cam on the second whereby the gears are separated, and means actuated by the separation of the gears for gripping an article to be cut.

7. In a machine for cutting off an article, the combination of a gear, a cutting tool carried by said gear, a second gear having a cam for feeding the cutting tool into an article to be cut, a third gear carrying a cam, means on the first mentioned gear for contacting with the cam on the third gear for separating the third gear from said first mentioned gear, and means actuated by the separation of the gears for gripping the article to be cut, all of said gears being driven by a common driving means whereby the actuation of the cutting tool and the gripping means are synchronized.

8. In a machine, for cutting off an article, the combination of a bearing, a collet within the bearing for gripping the article to be cut, a plurality of gears mounted on said bearing and rotated by common driving means, a cutting tool movably carried by one of said gears, a cam carried by a second of said gears for causing the cutting tool to cut the article to be cut, and a third of said gears having means for causing the actuation of the collet in timed relation to the actuation of the cutting tool by the cam.

9. In a machine for cutting off an article, the combination of a bearing, a collet within the bearing for gripping the article to be cut, a plurality of gears mounted on said bearing and rotated by common driving means, a cutting tool movably carried by one of said gears, a cam carried by a second of said gears for causing the cutting tool to move radially of the gear carrying the same while the gear and tool are rotating to cut the article to be cut, and a third of said gears having means for causing the actuation of the collet in timed relation to the actuation of the cutting tool by the cam.

In testimony whereof we hereunto affix our signatures this 15th day of July, 1930.

BERNARD J. O'CONNOR.
JOHN J. HANNON.